United States Patent

Ogata

[11] Patent Number: 5,339,195
[45] Date of Patent: Aug. 16, 1994

[54] TWO UNIT ZOOM LENS SYSTEM

[75] Inventor: Yasuji Ogata, Tokyo, Japan

[73] Assignee: Olympus Optical Co., Ltd., Tokyo, Japan

[21] Appl. No.: 917,331

[22] Filed: Jul. 23, 1992

[30] Foreign Application Priority Data

Jul. 24, 1991 [JP] Japan .................. 3-182750

[51] Int. Cl.⁵ .................................. G02B 15/14
[52] U.S. Cl. ................................ 359/691; 359/676
[58] Field of Search ........... 359/676, 683, 691, 770, 359/793

[56] References Cited

U.S. PATENT DOCUMENTS

| | | | |
|---|---|---|---|
| 3,705,759 | 12/1972 | Cook et al. | 359/683 |
| 4,828,372 | 5/1989 | Betensky et al. | 359/691 X |
| 4,976,522 | 12/1990 | Igarashi | 359/691 X |
| 5,076,677 | 12/1991 | Sato | 359/691 X |

FOREIGN PATENT DOCUMENTS 62-50718  3/1987  Japan .

Primary Examiner—William L. Sikes
Assistant Examiner—David Parsons
Attorney, Agent, or Firm—Cushman, Darby & Cushman

[57] ABSTRACT

The present invention provides a two-unit zoom lens system comprising, in order from the object side, a first lens unit G1 having a negative refracting power and a second lens unit G2 consisting of a first positive sub-lens-unit P1, a first negative sub-lens-unit N1, a second positive sub-lens-unit P2 and a second negative sub-lens-unit N2 and having a positive refracting power as a whole, and including an air gap between said first and second lens units, which is variable for zooming. In this zoom lens system which is made waterproof, inexpensive and of high performance, the amount of movement of the first lens unit G1 in association with zooming is reduced.

12 Claims, 12 Drawing Sheets

FIG. 6(a) FIG. 6(b) FIG. 6(c) FIG. 6(d)

F.NO 4.78 — d-line, g-line, M (Meridional), S (Sagittal), ω 30.96°, g-line

−0.5 to 0.5 Spherical aberration | −0.5 to 0.5 Astigmatism | −5.0 to 5.0 Distortion (%) | −0.05 to 0.05 Chromatic aberration of magnification FIG. 6(e) FIG. 6(f) FIG. 6(g) FIG. 6(h)

F.NO 5.72 | ω 23.57° | ω 23.57° | ω 23.57°

−0.5 to 0.5 Spherical aberration | −0.5 to 0.5 Astigmatism | −5.0 to 5.0 Distortion (%) | −0.05 to 0.05 Chromatic aberration of magnification FIG. 7(a)　　FIG. 7(b)　　FIG. 7(c)　　FIG. 7(d)
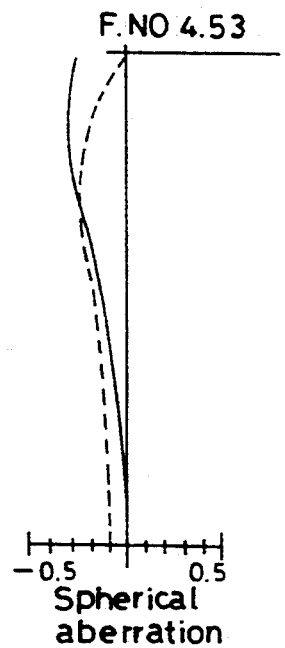
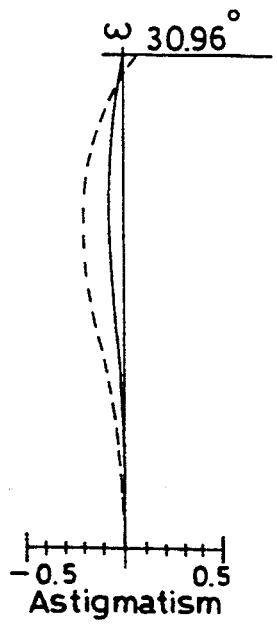
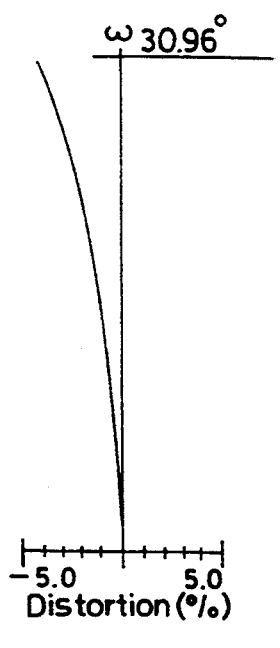
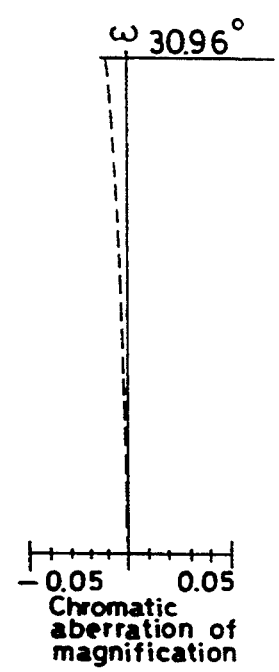
FIG. 7(e)　　FIG. 7(f)　　FIG. 7(g)　　FIG. 7(h)
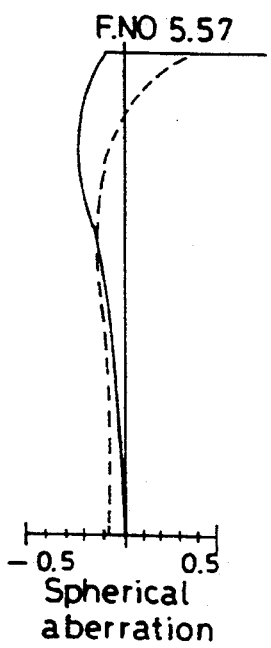
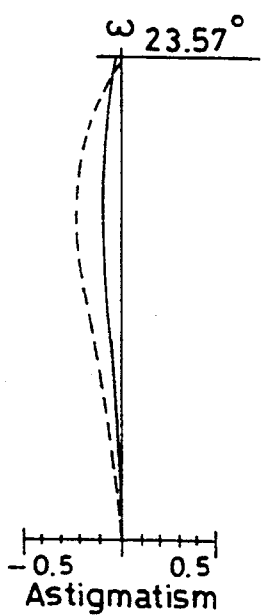
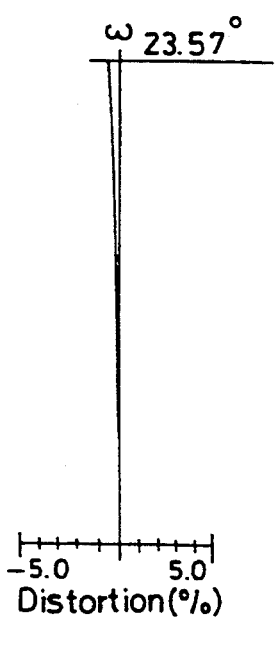
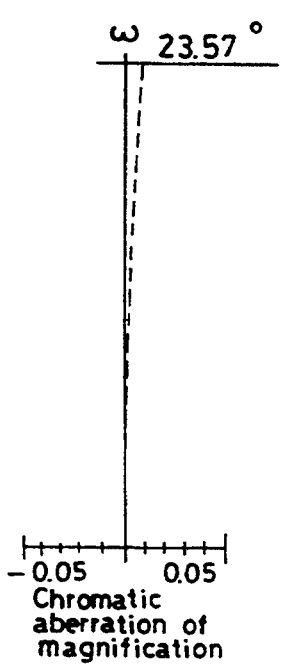

Spherical aberration

Astigmatism

Distortion(%)

Chromatic aberration of magnification

Spherical aberration

Astigmatism

Distortion(%)

Chromatic aberration of magnification

Spherical aberration

Astigmatism

Distortion(%)

Chromatic aberration of magnification

Spherical aberration

Astigmatism

Distortion(%)

Chromatic aberration of magnification

Spherical aberration

Astigmatism

Distortion(%)

Chromatic aberration of magnification

FIG. 9(i)   FIG. 9(j)   FIG. 9(k)   FIG. 9(l)
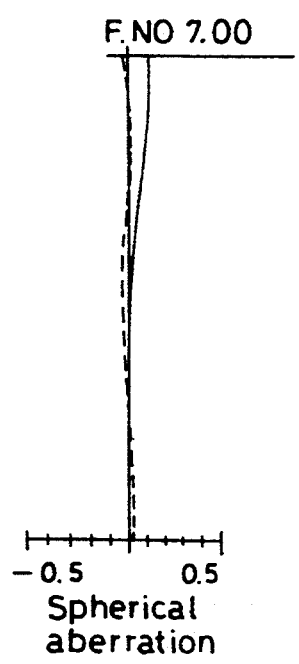
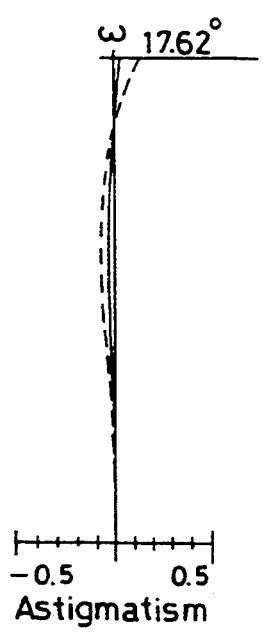
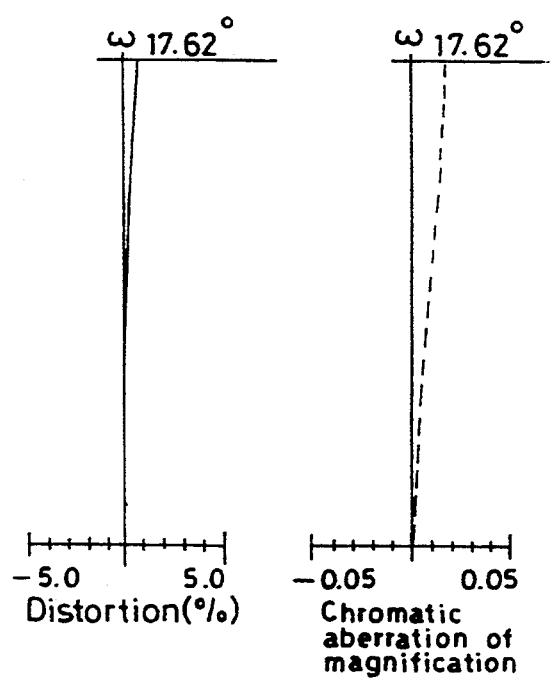

F.NO 7.00

−0.5  0.5
Spherical
aberration

ω 17.62°

−0.5  0.5
Astigmatism

ω 17.62°

−5.0  5.0
Distortion(%)

ω 17.62°

−0.05  0.05
Chromatic
aberration of
magnification

TWO UNIT ZOOM LENS SYSTEM

BACKGROUND OF THE INVENTION

The present invention relates generally to a taking zoom lens system for lens shutter cameras, which comprises two units, the first unit having a negative refracting power and the second unit having a positive refracting power, and more particularly to a two-unit zoom lens system designed for waterproof purposes.

So far, many positive-unit preceding type zoom lens systems, represented by a two-unit or positive/negative-unit zoom lens system and a three-unit or positive/positive/negative-unit zoom lens system, have been proposed and practically used as zoom lens systems for lens shutter cameras. However, the positive-unit preceding type zoom lens systems are unpreferred, because the amount of movement of the first units in association with zooming is so increased that the mechanical structure for water is complicated.

In order to achieve waterproofness with a simple structure, it is thus desired to eliminate, or at least reduce, the amount of movement of the first unit in association with zooming. Negative-unit preceding type zoom lens systems have been known to have such a feature. In particular, a two-unit or negative/positive-unit type zoom lens system is often practically used as the standard zoom lens for a single-lens reflex camera's interchangeable lens. However, the single-lens reflex camera lens is not suitable for lens shutter cameras without making some modification thereto, because the back focus is long and hence the total lens length is increased.

As known so far in the art, reducing the total lens length may be achieved by constructing the unit on the image-taking side in positive/negative telephoto type. For instance, Japanese Provisional Patent Publication No. 62-50718 sets forth an example of applying this concept to a two-unit or negative/positive-unit zoom lens system.

According to Japanese Provisional Patent Publication No. 62-50718, reducing the total lens length is achieved by constructing the second unit having a positive refracting power of positive and negative lens components.

However, the zoom lens system set forth in Japanese Provisional Patent Publication No. 62-50718 has a cost problem, because it comprises as many as 9 lens components plus two additional aspherical surfaces.

SUMMARY OF THE INVENTION

In view of the disadvantages of the prior art mentioned above, a main object of this invention is to provide a waterproof type of a two-unit or negative/positive-unit zoom lens system in which the lens arrangement is designed to reduce the number of lenses used, or when the number of lenses used is not reduced, cost reductions are achieved by eliminating the use of an aspherical surface.

The two-unit zoom lens system of this invention comprises, in order from the object side, a first lens unit having a negative refracting power and a second lens unit consisting of a first positive sub-lens-unit, a first negative sub-lens-unit, a second positive sub-lens-unit and a second negative sub-lens-unit and having a positive refracting power as a whole, and includes an air gap between said first and second lens units, which is variable for zooming.

Preferably, the zoom lens system includes a stop between the first lens unit and the second lens unit.

Preferably, the zoom lens system conforms to the following condition (1):

$$0.8 < |f_1|/f_W < 1.6. \quad (1)$$

Here
$f_1$ is the focal length of said first lens unit, and
$f_W$ is the focal length of the total system at the wide position.

Alternatively, it is desired that the zoom lens system conform to the following condition (2):

$$0.4 < e_T \cdot f_W/f_T < 3. \quad (2)$$

Here
$e_T$ is the air gap between said first and second lens units,
$f_T$ is the focal length of the total system at the tele position, and
$f_W$ is the focal length of the total system at the wide position.

Still alternatively, it is desired that the zoom lens system conform to the following condition (3):

$$0.3 < |f_N|/f_2 < 3. \quad (3)$$

Here
$f_2$ is the focal length of said second lens unit, and
$f_N$ is the focal length of said second negative sub-lens-unit in said second lens unit.

Still alternatively, it is desired that the zoom lens system conform to the following condition (4):

$$0.4 < |r_a|/f_2 < 3. \quad (4)$$

Here
$f_2$ is the focal length of said second lens unit, and
$r_a$ is the radius of curvature on the object side of said first negative sub-lens-unit in said second lens unit.

In the ensuing description, why the lens arrangement mentioned above is used and how it acts will be explained.

Formula (1) mentioned above defines the condition for achieving waterproofness that is the object of this invention, and relates to the amount of movement of the first unit in association with zooming. In the case of a general negative/positive two-unit zoom lens system, the amount of movement of the first unit is minimized, when the image-formation magnification is 1 at the intermediate focal length given by $(f_W \cdot f_T)^{\frac{1}{2}}$. The farther the lens system departs from this condition, the more the amount of movement of the first unit; in other words, it is desired that the condition (1) be satisfied. In particular, exceeding the upper limit of Formula (1) is unpreferred, because both the total lens length and the lens diameter of the first unit are increased. Below the lower limit of Formula (1), on the other hand, the power of the first unit becomes too strong, making correction of the curvature of field and distortion difficult. This is contrary to cost reductions, because it is required to increase the number of lenses in the first unit.

Formula (2) mentioned above concerns the inter-unit space at the tele position. When the upper limit of Formula (2) is exceeded, the total lens length is increased, failing to make the zoom lens system compact. An air gap smaller than the lower limit is unpreferred, because mechanical interference is likely to occur by production or regulation errors.

Formula (3) is directed to the second negative lens component in the second unit. In this invention, the negative lens component is located on the image side of the triplet arrangement of the second unit basically comprising the positive, negative and positive lens components, whereby the second unit is constructed in telephoto type, and the principal point location is brought close to the object side, whereby the back focus is reduced, resulting in achievement of a reduction of the total lens length. Thus, Formula (3) is important for keeping the zoom lens system compact. When the upper limit of Formula (3) is exceeded, the power becomes feeble and the effect of the telephoto type becomes slender, failing to make the zoom lens system compact. When the lower limit is not reached, the power becomes strong enough to make the zoom lens system compact, but the curvature of field and distortion are likely to increase, failing to attain sufficient performance.

Formula (4) pertains to the first negative lens component in the second unit, defining the condition for achieving correction of spherical aberration and coma. Departing from this conditional formula fails to attain good enough performance in terms of spherical aberration and coma.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In what follows, some examples of the zoom lens system according to this invention will be explained more specifically.

Figure 1:
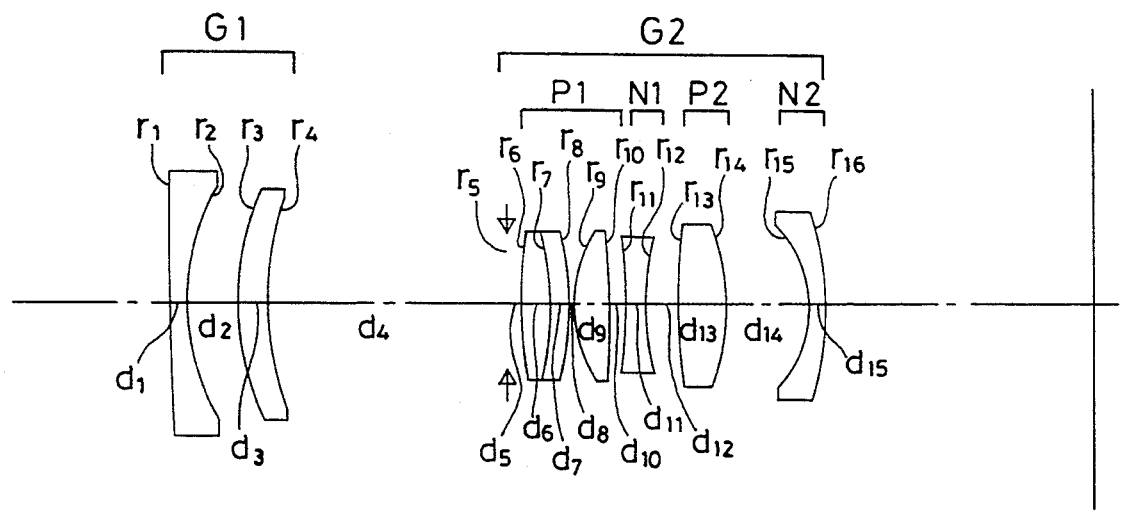
FIGS. 1–5 represent in section the lens arrangements of Examples 1–5 of this invention.
Figure 2:
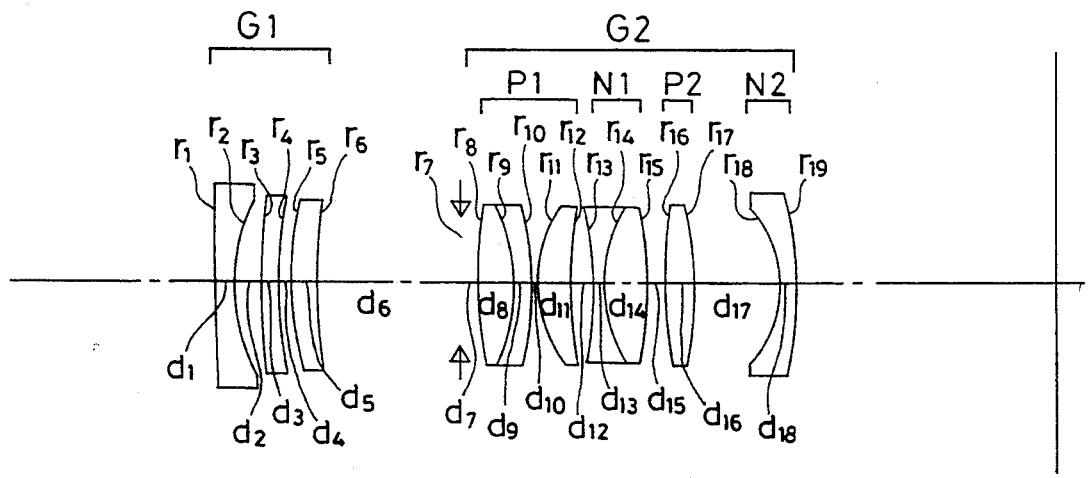
Figure 3:
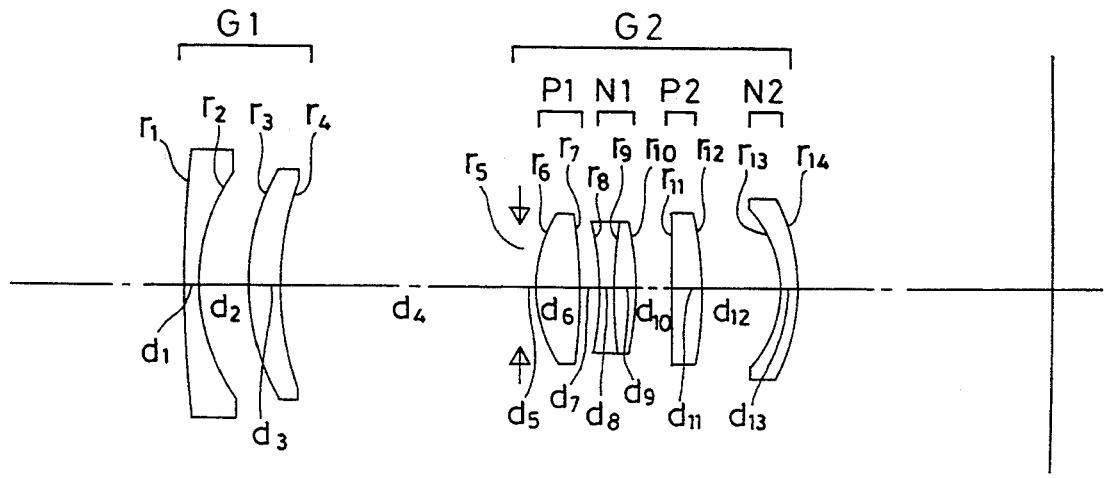
Figure 4:
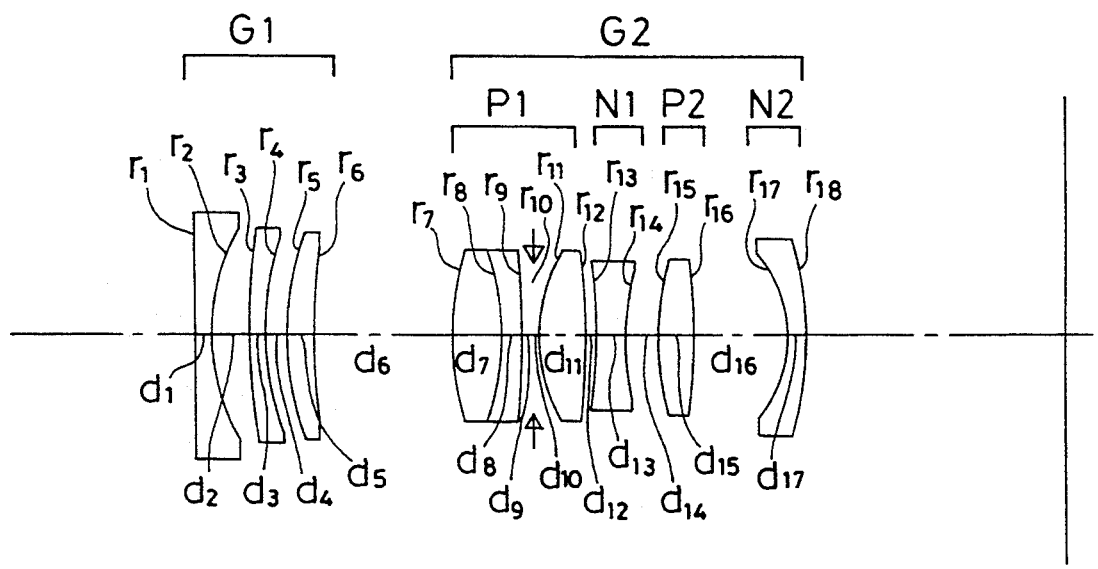
Figure 5:
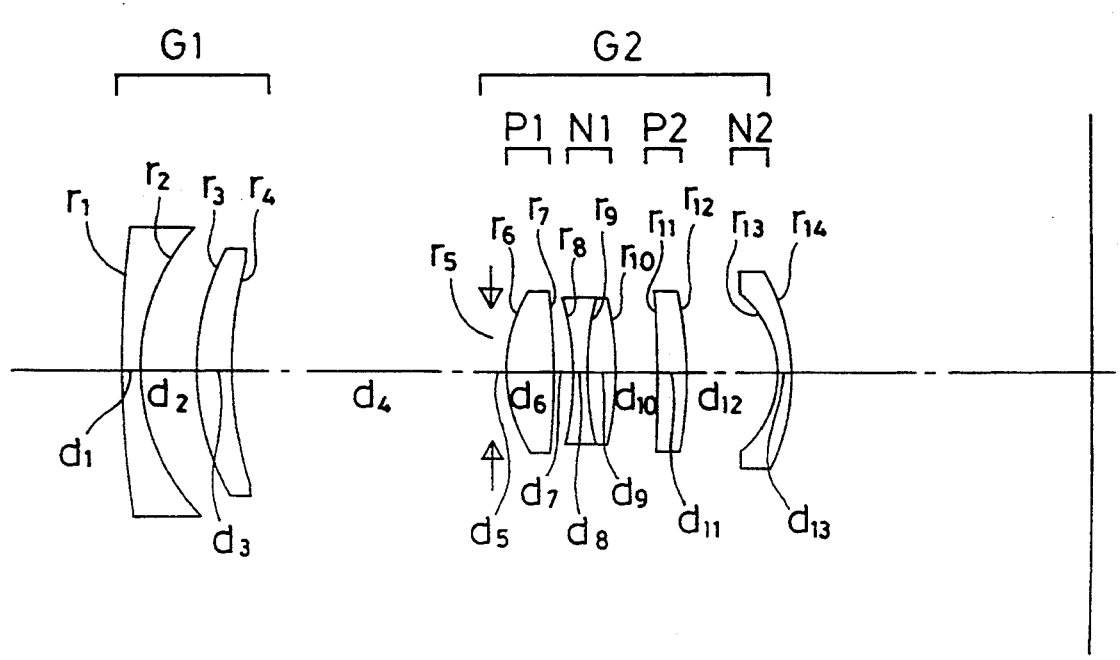

The zoom lens systems according to Examples 1–5, the lens data of which will be given later, have a focal length of 36–68 mm and a zoom ratio of 2, and the sectional views of their lens arrangements are shown in FIGS. 1 to 5.

Both Examples 1 and 2 are all directed to using spherical surfaces. In Example 3 or 4 one aspherical surface is incorporated in the second unit G2, and in Example 5 two aspherical surfaces are used, one in the first unit G1 and another in the second unit G2.

In Example 1, 3 or 5 the first unit G1 comprises, in order from the object side, a negative meniscus lens convex on the object side and a positive meniscus lens convex on the object side, two lenses in all. In Example 2 or 4, on the other hand, the first unit G1 comprises, in order from the object side, two negative lenses and a positive meniscus lens convex on the object side, three lenses in all.

In Example 1, 2 or 4 the first positive lens component P1 of the second unit G2 consists of a cemented positive lens and a positive lens, and in Example 3 or 5 it consists of one positive lens. In Example 1 or 4 the first negative lens component N1 of the second unit G2 consists of one double-concave lens, and in Example 2, 3 or 5 it consists of a cemented lens of negative and positive lenses.

In each example, the second positive lens component P2 of the second unit G2 consists of one positive lens and the second negative lens component N2 of the second unit G2 consists of one negative meniscus lens convex on the image side.

It is noted that if the stop is located in the second unit G2, as is the case with Example 4, then the performance of the zoom lens system drops considerably due to the eccentric arrangement of the lenses with the stop interposed between them. Thus, the stop should preferably be located proximately to the object side of the second unit G2. Preferably, the aspherical surface in the second unit G2 should be of such configuration that its positive refracting power decreases gradually from the optical axis toward the periphery. On the other hand, it is desired that the aspherical surface in the first unit G1 be of such configuration that its negative refracting power decreases gradually from the optical axis toward the periphery.

It is noted that the symbols used hereinafter but not referred to hereinbefore mean:

f: focal length of the total system
$F_{NO}$: F-number
$\omega$: half field angle
$f_B$: back focus
$r_1, r_2, \ldots$ : radii of curvature of the lens surfaces
$d_1, d_2, \ldots$ : separation between adjacent lenses surfaces
$n_{d1}, n_{d2}, \ldots$ : d-line refractive indices of the lenses
$\nu_{d1}, \nu_{d2}, \ldots$ : Abbe's number of the lenses Let x denote the optical axis direction and y denote the direction normal to the optical axis, then aspherical configuration is expressed by the following formula:

$$x = (y^2/r)/[1+\{1-(y/r)^2\}^{\frac{1}{2}}] + A_4 Y^4 + A_6 Y^6 + A_8 Y^8 + A_{10} Y^{10},$$

provided that r is the radius of curvature on the optical axis and $A_4$, $A_6$, $A_8$ and $A_{10}$ are aspherical coefficients.

EXAMPLE 1

$f = 36 \sim 49.5 \sim 68$
$F_{NO} = 4.78 \sim 5.72 \sim 7.00$
$\omega = 30.96 \sim 23.57 \sim 17.62°$
$f_B = 25.01 \sim 32.64 \sim 43.09$

| | | | |
|---|---|---|---|
| $r_1 = 226.5480$ | $d_1 = 1.5000$ | $n_{d1} = 1.77250$ | $\nu_{d1} = 49.66$ |
| $r_2 = 19.4300$ | $d_2 = 4.7400$ | | |
| $r_3 = 22.8680$ | $d_3 = 3.0000$ | $n_{d2} = 1.78472$ | $\nu_{d2} = 25.68$ |
| $r_4 = 37.8800$ | $d_4 = $ (Variable) | | |
| $r_5 = \infty$ (Stop) | $d_5 = 1.0000$ | | |
| $r_6 = 43.0970$ | $d_6 = 2.8200$ | $n_{d3} = 1.48749$ | $\nu_{d3} = 70.20$ |
| $r_7 = -21.9050$ | $d_7 = 1.5000$ | $n_{d4} = 1.84666$ | $\nu_{d4} = 23.78$ |
| $r_8 = -32.9020$ | $d_8 = 0.2000$ | | |
| $r_9 = 12.2760$ | $d_9 = 3.5600$ | $n_{d5} = 1.51633$ | $\nu_{d5} = 64.15$ |
| $r_{10} = -129.6920$ | $d_{10} = 1.5800$ | | |
| $r_{11} = -33.2070$ | $d_{11} = 1.7500$ | $n_{d6} = 1.83400$ | $\nu_{d6} = 37.16$ |
| $r_{12} = 22.5110$ | $d_{12} = 3.0100$ | | |
| $r_{13} = 54.5950$ | $d_{13} = 4.6700$ | $n_{d7} = 1.61293$ | $\nu_{d7} = 37.00$ |
| $r_{14} = -18.8410$ | $d_{14} = 7.6000$ | | |
| $r_{15} = -9.5260$ | $d_{15} = 1.5000$ | $n_{d8} = 1.77250$ | $\nu_{d8} = 49.66$ |
| $r_{16} = -23.2240$ | | | |

| Zooming Speces | | | |
|---|---|---|---|
| f | 36 | 49.5 | 68 |
| $d_4$ | 22.093 | 11.605 | 3.996 |

EXAMPLE 2

$f = 36 \sim 49.5 \sim 68$
$F_{NO} = 4.53 \sim 5.57 \sim 7.00$
$\omega = 30.96 \sim 23.57 \sim 17.62°$
$f_B = 25.42 \sim 34.24 \sim 46.34$

| | | | |
|---|---|---|---|
| $r_1 = 480.2200$ | $d_1 = 1.5900$ | $n_{d1} = 1.83400$ | $\nu_{d1} = 37.16$ |
| $r_2 = 17.4530$ | $d_2 = 2.6400$ | | |
| $r_3 = 89.6030$ | $d_3 = 1.5100$ | $n_{d2} = 1.72916$ | $\nu_{d2} = 54.68$ |
| $r_4 = 42.1160$ | $d_4 = 1.1300$ | | |
| $r_5 = 24.1140$ | $d_5 = 2.5600$ | $n_{d3} = 1.84666$ | $\nu_{d3} = 23.78$ |
| $r_6 = 72.5900$ | $d_6 = $ (Variable) | | |
| $r_7 = \infty$ (Stop) | $d_7 = 1.0000$ | | |
| $r_8 = 36.9230$ | $d_8 = 3.5200$ | $n_{d4} = 1.51821$ | $\nu_{d4} = 65.04$ |
| $r_9 = -17.8300$ | $d_9 = 1.5000$ | $n_{d5} = 1.83400$ | $\nu_{d5} = 37.16$ |
| $r_{10} = -34.2070$ | $d_{10} = 0.2000$ | | |
| $r_{11} = 12.4100$ | $d_{11} = 3.3400$ | $n_{d6} = 1.49700$ | $\nu_{d6} = 81.61$ |
| $r_{12} = 63.5900$ | $d_{12} = 1.8800$ | | |
| $r_{13} = -35.0500$ | $d_{13} = 1.5000$ | $n_{d7} = 1.83400$ | $\nu_{d7} = 37.16$ |
| $r_{14} = 15.4990$ | $d_{14} = 3.7500$ | $n_{d8} = 1.54814$ | $\nu_{d8} = 45.78$ |
| $r_{15} = -25.8120$ | $d_{15} = 1.5800$ | | |
| $r_{16} = 76.6070$ | $d_{16} = 2.5000$ | $n_{d9} = 1.57501$ | $\nu_{d9} = 41.49$ |
| $r_{17} = -29.5090$ | $d_{17} = 8.1000$ | | |
| $r_{18} = -9.5250$ | $d_{18} = 1.5100$ | $n_{d10} = 1.72916$ | $\nu_{d10} = 54.68$ |
| $r_{19} = -32.6020$ | | | |

| Zooming Speces | | | |
|---|---|---|---|
| f | 36 | 49.5 | 68 |
| $d_6$ | 13.518 | 7.429 | 3.012 |

EXAMPLE 3

$f = 36 \sim 49.5 \sim 68$
$F_{NO} = 4.80 \sim 5.73 \sim 7.00$
$\omega = 30.96 \sim 23.57 \sim 17.62°$
$f_B = 25.89 \sim 33.49 \sim 43.90$

| | | | |
|---|---|---|---|
| $r_1 = 106.2150$ | $d_1 = 1.5000$ | $n_{d1} = 1.77250$ | $\nu_{d1} = 49.66$ |
| $r_2 = 18.3350$ | $d_2 = 4.7900$ | | |
| $r_3 = 20.2790$ | $d_3 = 2.9000$ | $n_{d2} = 1.80518$ | $\nu_{d2} = 25.43$ |
| $r_4 = 29.1350$ | $d_4 = $ (Variable) | | |
| $r_5 = \infty$ (Stop) | $d_5 = 1.0000$ | | |
| $r_6 = 11.8750$ (Aspheric) | $d_6 = 4.3400$ | $n_{d3} = 1.48749$ | $\nu_{d3} = 70.20$ |
| $r_7 = -38.0310$ | $d_7 = 1.6600$ | | |
| $r_8 = -22.1390$ | $d_8 = 1.2000$ | $n_{d4} = 1.80518$ | $\nu_{d4} = 25.43$ |
| $r_9 = 60.4060$ | $d_9 = 2.1100$ | $n_{d5} = 1.56732$ | $\nu_{d5} = 42.83$ |
| $r_{10} = -28.0740$ | $d_{10} = 3.5400$ | | |
| $r_{11} = -236.4090$ | $d_{11} = 2.4400$ | $n_{d6} = 1.84666$ | $\nu_{d6} = 23.78$ |
| $r_{12} = -37.4090$ | $d_{12} = 7.6300$ | | |
| $r_{13} = -8.8330$ | $d_{13} = 1.5000$ | $n_{d7} = 1.72916$ | $\nu_{d7} = 54.68$ |
| $r_{14} = -18.6620$ | | | |

| Zooming Speces | | | |
|---|---|---|---|
| f | 36 | 49.5 | 68 |
| $d_4$ | 22.210 | 11.658 | 4.002 |

Aspherical Coefficients
6th surface $A_4 = -0.36867 \times 10^{-4}$
$A_6 = 0.22551 \times 10^{-7}$
$A_8 = -0.59906 \times 10^{-8}$
$A_{10} = 0.48085 \times 10^{-10}$

EXAMPLE 4

$f = 36 \sim 49.5 \sim 68$
$F_{NO} = 4.41 \sim 5.50 \sim 7.00$
$\omega = 30.96 \sim 23.57 \sim 17.62°$
$f_B = 23.41 \sim 32.19 \sim 44.21$

| | | | |
|---|---|---|---|
| $r_1 = -4088.5440$ | $d_1 = 1.5400$ | $n_{d1} = 1.77250$ | $\nu_{d1} = 49.66$ |
| $r_2 = 18.4040$ | $d_2 = 3.0100$ | | |
| $r_3 = 43.7950$ | $d_3 = 1.5000$ | $n_{d2} = 1.72916$ | $\nu_{d2} = 54.68$ |
| $r_4 = 25.3480$ | $d_4 = 1.6000$ | | |
| $r_5 = 21.9920$ | $d_5 = 2.5000$ | $n_{d3} = 1.80518$ | $\nu_{d3} = 25.43$ |
| $r_6 = 53.2760$ | $d_6 = $ (Variable) | | |
| $r_7 = 18.9950$ | $d_7 = 4.7400$ | $n_{d4} = 1.51633$ | $\nu_{d4} = 64.15$ |
| $r_8 = -19.3720$ | $d_8 = 1.5000$ | $n_{d5} = 1.80518$ | $\nu_{d5} = 25.43$ |
| $r_9 = -68.2490$ | $d_9 = 0.7000$ | | |
| $r_{10} = \infty$ (Stop) | $d_{10} = 0.7000$ | | |
| $r_{11} = 14.2830$ | $d_{11} = 3.9600$ | $n_{d6} = 1.52310$ | $\nu_{d6} = 50.84$ |
| $r_{12} = -37.3330$ | $d_{12} = 0.8600$ | | |
| $r_{13} = -32.0230$ | $d_{13} = 2.4900$ | $n_{d7} = 1.83400$ | $\nu_{d7} = 37.16$ |
| $r_{14} = 26.2630$ | $d_{14} = 2.6700$ | | |
| $r_{15} = 26.4790$ | $d_{15} = 3.0300$ | $n_{d8} = 1.60342$ | $\nu_{d8} = 38.01$ |
| $r_{16} = -34.0970$ (Aspheric) | $d_{16} = 8.1000$ | | |
| $r_{17} = -9.3770$ | $d_{17} = 1.5600$ | $n_{d9} = 1.72916$ | $\nu_{d9} = 54.68$ |
| $r_{18} = -23.8080$ | | | |

| Zooming Speces | | | |
|---|---|---|---|
| f | 36 | 49.5 | 68 |
| $d_5$ | 11.429 | 5.970 | 2.010 |

Aspherical Coefficients
16th surface $A_4 = 0.33367 \times 10^{-4}$
$A_6 = 0.67370 \times 10^{-7}$
$A_8 = -0.12555 \times 10^{-8}$
$A_{10} = -0.57413 \times 10^{-11}$

EXAMPLE 5

$f = 36 \sim 49.5 \sim 68$
$F_{NO} = 4.82 \sim 5.74 \sim 7.00$
$\omega = 30.96 \sim 23.57 \sim 17.62°$
$f_B = 27.52 \sim 35.47 \sim 46.36$

| | | | |
|---|---|---|---|
| $r_1 = 93.0670$ | $d_1 = 1.5000$ | $n_{d1} = 1.77250$ | $\nu_{d1} = 49.66$ |
| $r_2 = 17.3450$ (Aspheric) | $d_2 = 4.8000$ | | |
| $r_3 = 20.2580$ | $d_3 = 2.9000$ | $n_{d2} = 1.80518$ | $\nu_{d2} = 25.43$ |
| $r_4 = 29.8960$ | $d_4 = $ (Variable) | | |
| $r_5 = \infty$ (Stop) | $d_5 = 1.0000$ | | |
| $r_6 = 12.0320$ (Aspheric) | $d_6 = 4.3300$ | $n_{d3} = 1.48749$ | $\nu_{d3} = 70.20$ |
| $r_7 = -40.7490$ | $d_7 = 1.6200$ | | |
| $r_8 = -22.4920$ | $d_8 = 1.2000$ | $n_{d4} = 1.80518$ | $\nu_{d4} = 25.43$ |
| $r_9 = 59.8850$ | $d_9 = 2.1400$ | $n_{d5} = 1.56444$ | $\nu_{d5} = 43.78$ |
| $r_{10} = -28.1010$ | $d_{10} = 3.6000$ | | |
| $r_{11} = -210.7850$ | $d_{11} = 2.4900$ | $n_{d6} = 1.84666$ | $\nu_{d6} = 23.78$ |
| $r_{12} = -36.9810$ | $d_{12} = 7.6400$ | | |
| $r_{13} = -8.9400$ | $d_{13} = 1.5000$ | $n_{d7} = 1.72916$ | $\nu_{d7} = 54.68$ |
| $r_{14} = -17.4830$ | | | |

| Zooming Speces | | | |
|---|---|---|---|
| f | 36 | 49.5 | 68 |
| $d_4$ | 22.241 | 11.670 | 4.001 |

Figure 6I:
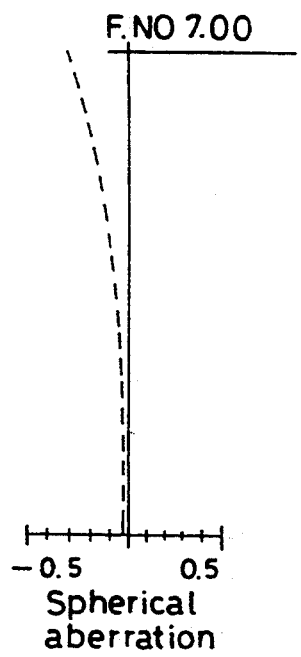
FIGS. 6(a)–10(l) are aberration diagrams showing the spherical aberrations, astigmatisms, distortions and chromatic aberrations of magnification of Examples 1–5 at the (a) wide, (b) standard and (c) tele positions.
Figure 6J:
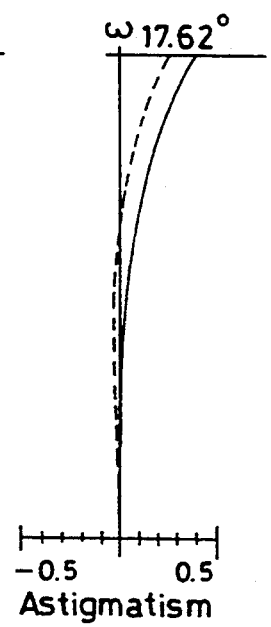
Figure 6K:
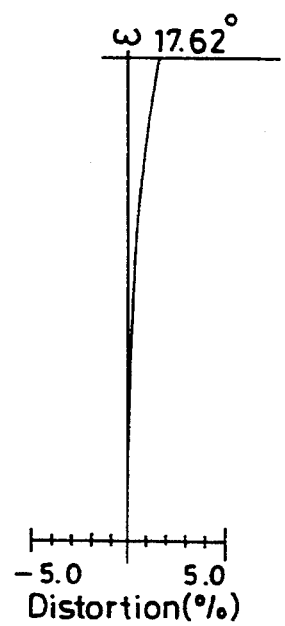
Figure 6L:
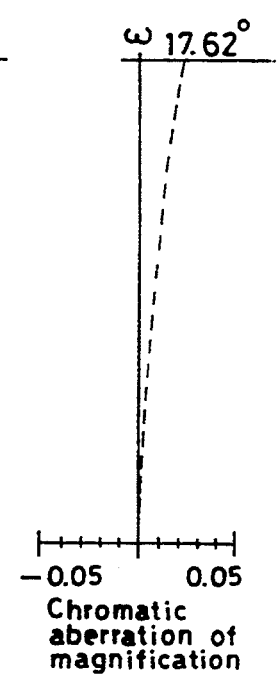
Figure 7I:
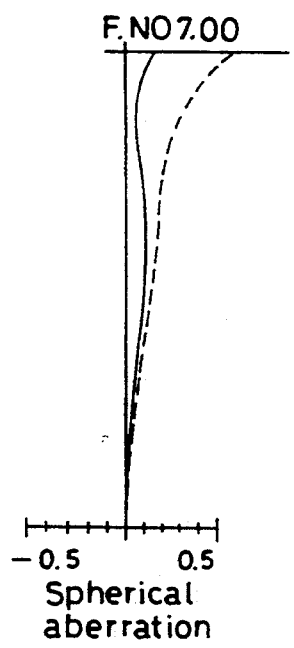
Figure 7J:
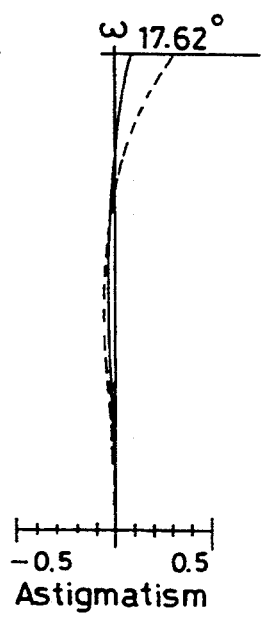
Figure 7K:
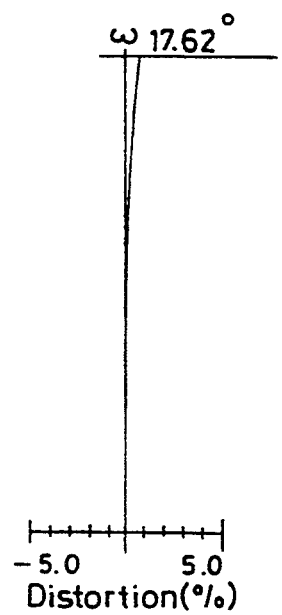
Figure 7L:
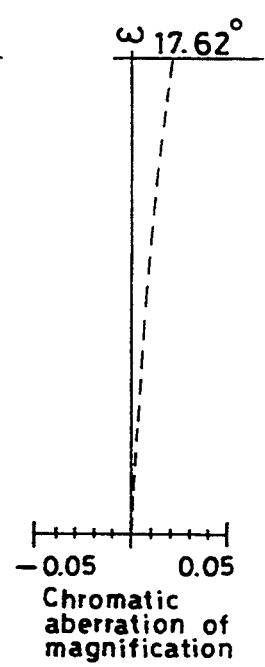
Figure 8A:
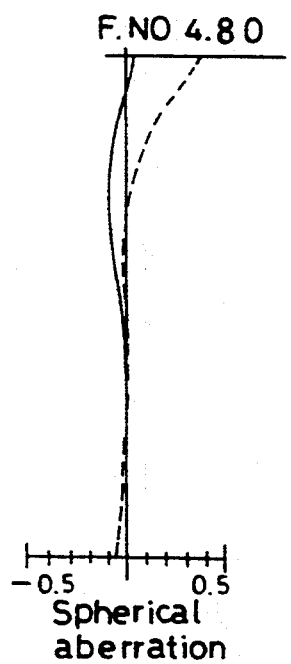
Figure 8B:
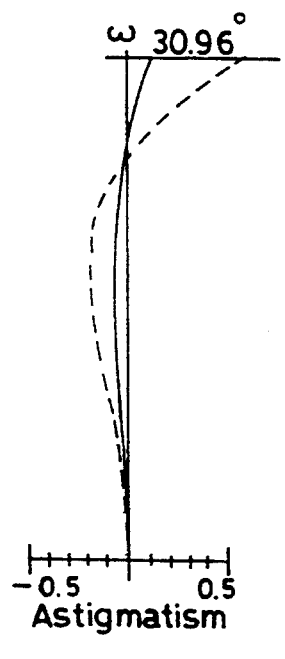
Figure 8C:
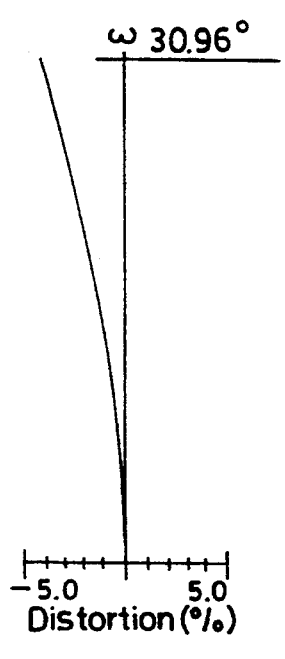
Figure 8D:
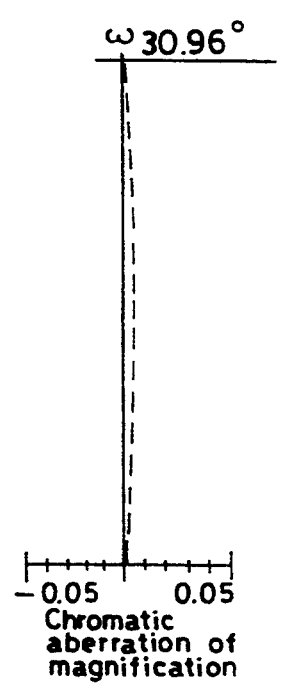
Figure 8E:
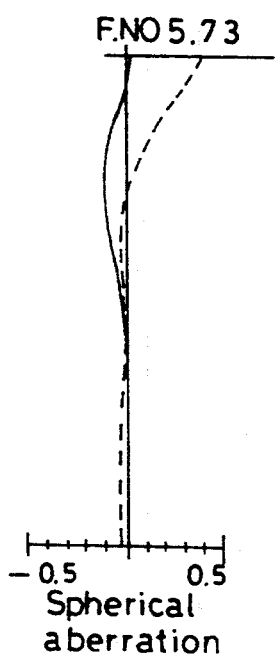
Figure 8F:
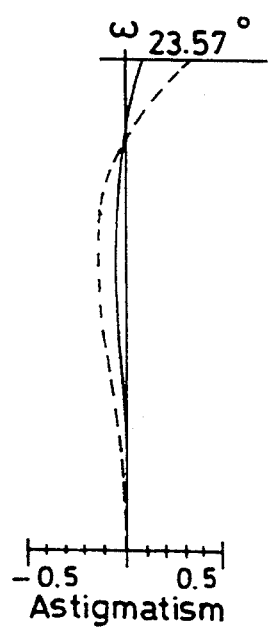
Figure 8G:
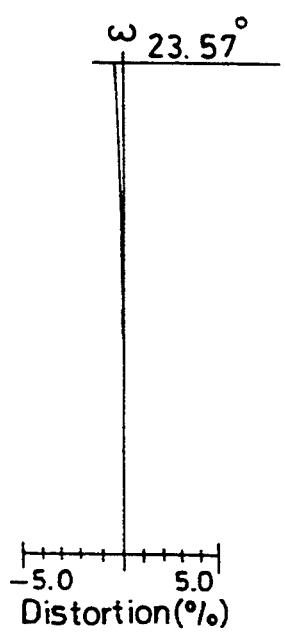
Figure 8H:
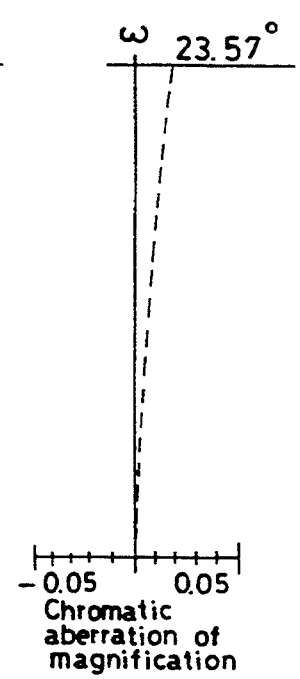
Figure 8I:
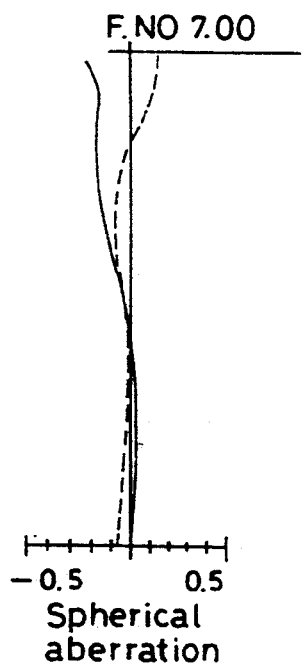
Figure 8J:
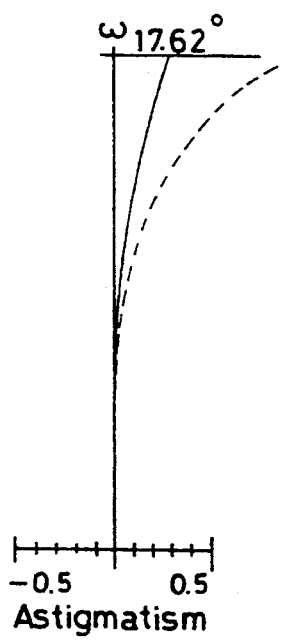
Figure 8K:
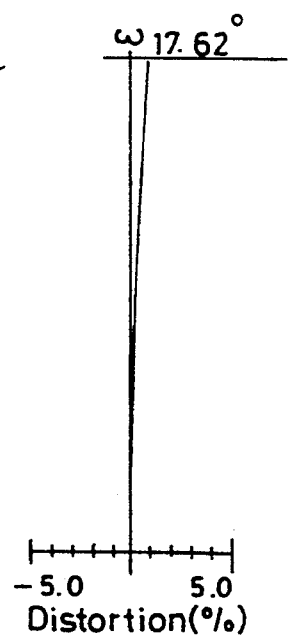
Figure 8L:
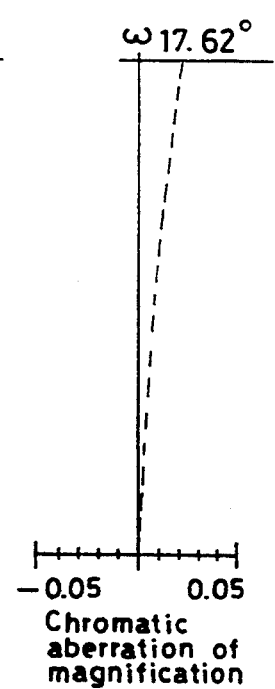
Figure 9A:
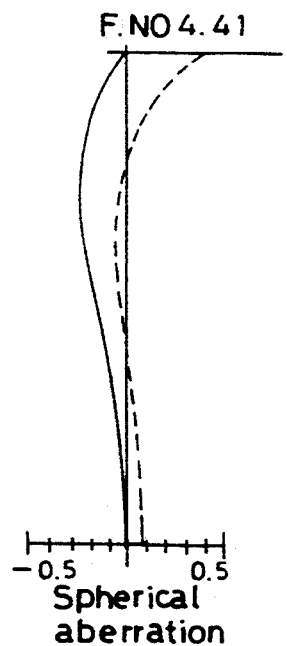
Figure 9B:
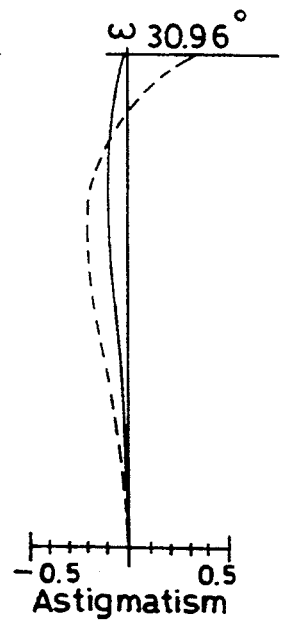
Figure 9C:
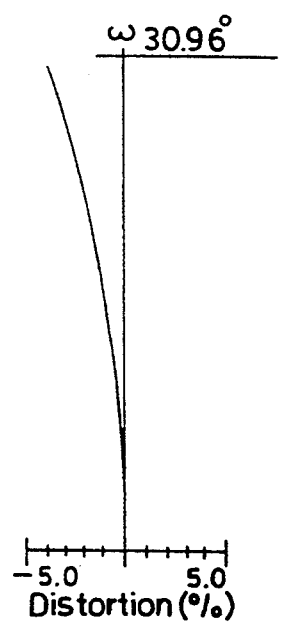
Figure 9D:
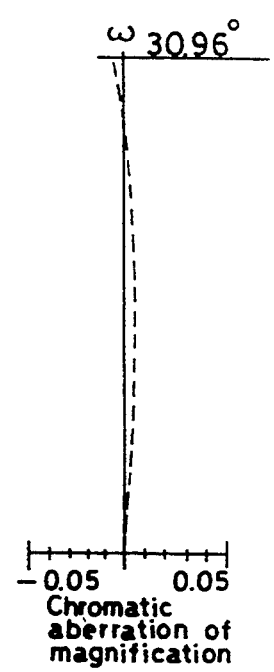
Figure 9E:
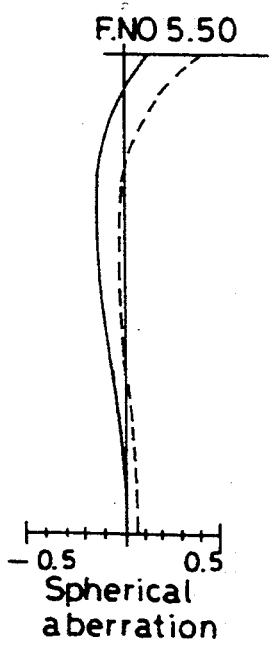
Figure 9F:
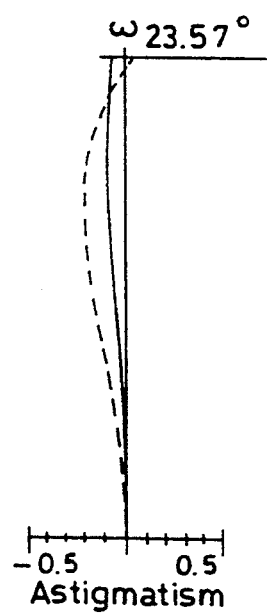
Figure 9G:
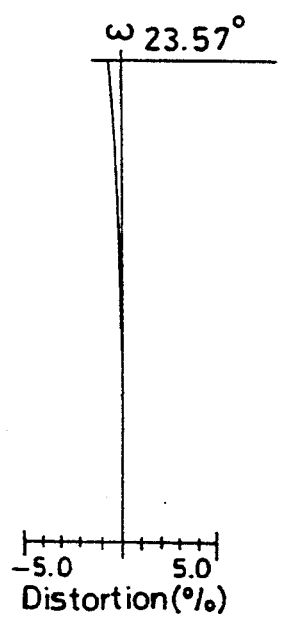
Figure 9H:
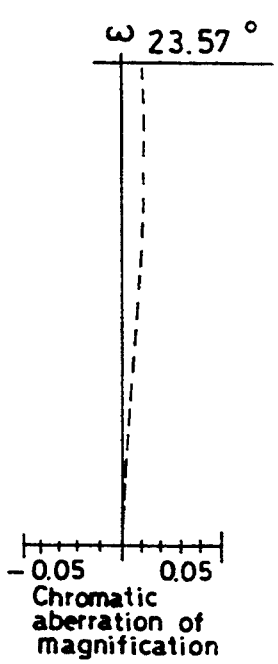
Figure 10A:
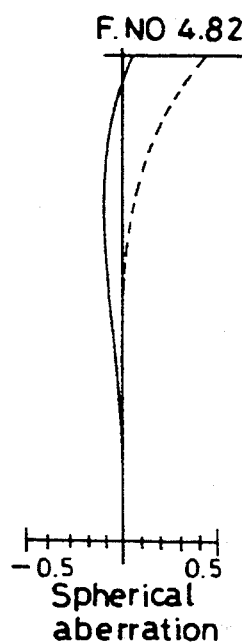
Figure 10B:
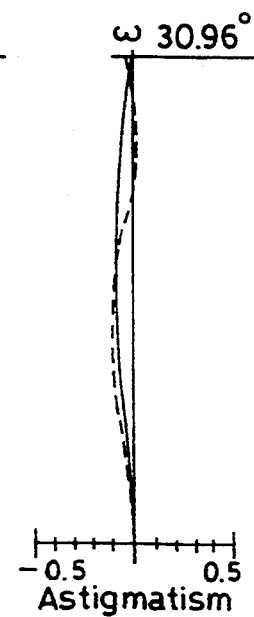
Figure 10C:
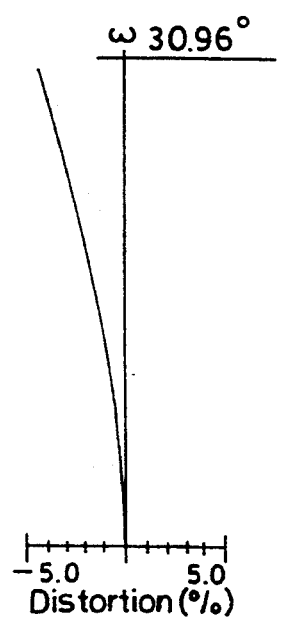
Figure 10D:
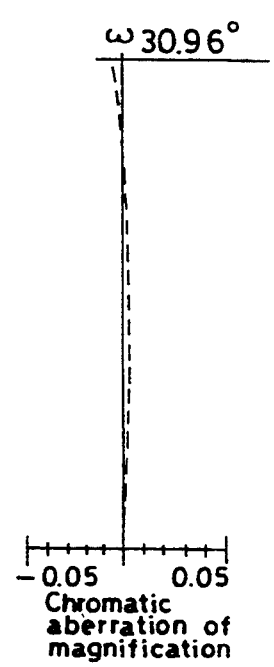
Figure 10E:
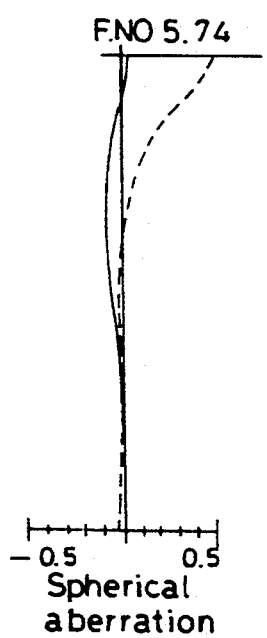
Figure 10F:
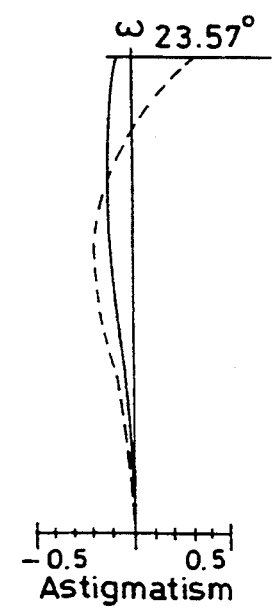
Figure 10G:
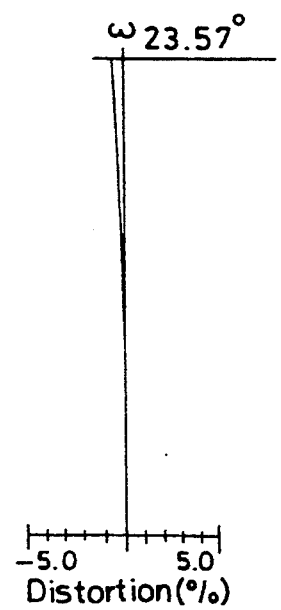
Figure 10H:
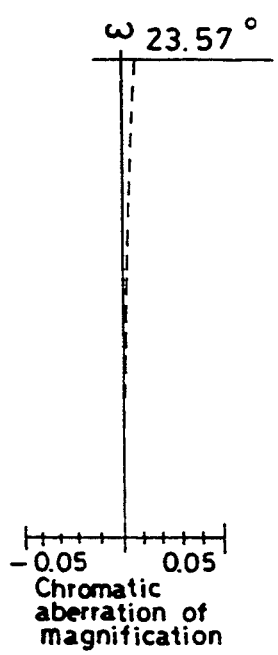
Figure 10I:
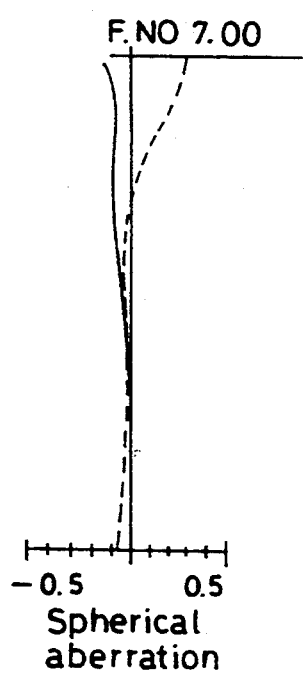
Figure 10J:
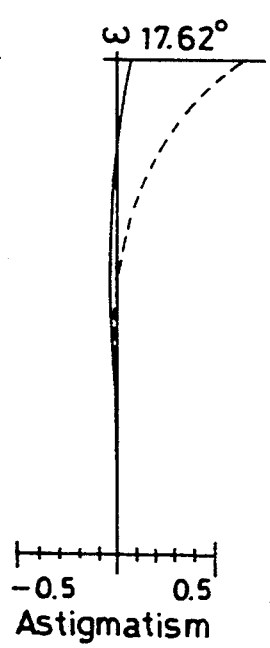
Figure 10K:
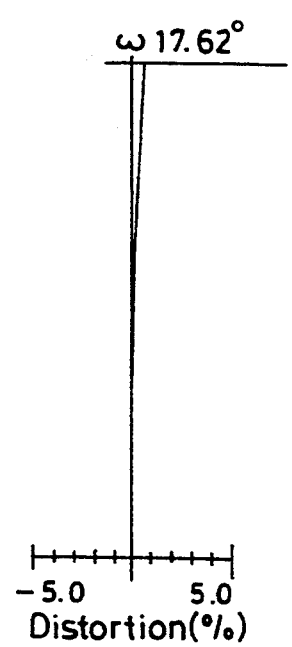
Figure 10L:
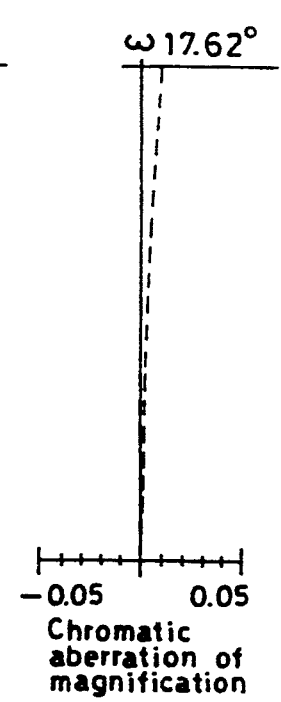

Aspherical Coefficients
second surface $A_4 = -0.25258 \times 10^{-5}$
$A_6 = 0.95586 \times 10^{-8}$
$A_8 = -0.14887 \times 10^{-9}$
$A_{10} = 0$ 6th surface $A_4 = -0.31976 \times 10^{-4}$
$A_6 = -0.47847 \times 10^{-7}$
$A_8 = -0.32988 \times 10^{-8}$
$A_{10} = 0.25768 \times 10^{-10}$ The spherical aberrations, astigmatisms, distortions and chromatic aberrations of magnification of Examples 1–5 at the (a) wide, (b) standard and (c) tele positions are shown in the aberration diagrams of FIGS. 6–10.

Set out below are the values of the conditional formulae (1)–(4) in Examples 1–5.

| | Example 1 | Example 2 | Example 3 | Example 4 | Example 5 |
|---|---|---|---|---|---|
| (1) | 1.37 | 0.97 | 1.38 | 0.92 | 1.35 |
| (2) | 2.12 | 1.59 | 2.12 | 1.07 | 2.12 |

-continued

| | Example 1 | Example 2 | Example 3 | Example 4 | Example 5 |
|---|---|---|---|---|---|
| (3) | 0.78 | 0.83 | 0.88 | 1.03 | 0.95 |
| (4) | 1.19 | 1.53 | 0.79 | 1.48 | 0.78 |

As explained above, the present invention provides a two-unit zoom lens system in which the amount of movement of the first unit in association with zooming is reduced and which is made waterproof, inexpensive and of high performance.

What we claim is:

1. A two-unit zoom lens system comprising, in order from the object side:
    a first lens unit having negative refracting power, and
    a second lens unit consisting of, in order from the object side, a first positive sub-lens unit, a first negative sub-lens unit located with a first separation between said first negative sub-lens unit and said first positive sub-lens unit, a second positive sub-lens unit with a second separation between said second positive sub-lens unit and said first negative sub-lens unit and a second negative sub-lens unit with a third separation between said second negative sub-lens unit and said second positive sub-lens unit, said second lens unit having a positive power as a whole,
    wherein for zooming from a wide angle end to a telephoto end, a separation between said first lens unit and said second lens unit is varied while the first, second, and third separations are kept constant.

2. A two-unit zoom lens system as claimed in claim 1, wherein a stop is disposed between said first lens unit and said second lens unit.

3. A two-unit lens system as claimed in claim 1, which satisfied the following condition (1):

$$0.8 < |f_1|/f_w < 1.6 \quad (1)$$

where $f_1$ is the focal length of said first lens unit, and $f_w$ is the focal length of the total system at the wide angle position.

4. A two-unit zoom lens system as claimed in claim 1, which satisfies the following condition (2):

$$0.4 < e_T \cdot f_W/f_T < 3 \quad (2)$$

where $e_T$ is the air gap between said first and second lens units, $f_T$ is the focal length of the total system at the tele angle position, and $f_W$ is the focal length of the total system at the wide angle end.

5. A two-unit lens system as claim in claim 1, which satisfies the following condition (3):

$$0.3 < |f_N|/f_2 < 3 \quad (3)$$

where $f_2$ is the focal length of said second lens unit, and $f_N$ is the focal length of said second negative sub-lens unit in said second lens unit.

6. A two-unit lens system as claimed in claim 1, which satisfies the following condition (4):

$$0.4 < |r_a|/f_2 < 3 \quad (4)$$

where $f_2$ is the focal length of said second lens unit, and $r_a$ is the radius of curvature on the object side of said first negative sub-lens unit in said second lens unit.

7. A two-unit zoom lens system comprising, in order from the object side,
    a first lens unit having negative refracting power, and
    a second lens unit consisting of, in order from the object side, a first positive sub-lens unit, a first negative sub-lens unit located with a first separation between said first negative sub-lens unit and said first positive sub-lens unit, a second positive sub-lens unit with a second separation between said second positive sub-lens unit and said first negative sub-lens unit and a second negative sub-lens unit with a third separation between said second negative sub-lens unit and said second positive sub-lens unit, and having positive power as a whole,
    wherein for zooming from a wide angle end to a telephoto end, said second lens unit is moved as a unit along the optical axis, thereby varying a separation between said first lens unit and said second lens unit.

8. A two-unit zoom lens system as claimed in claim 7, wherein a stop is disposed between said first lens unit and said second lens unit.

9. A two-unit lens system as claimed in claim 7, which satisfies the following condition (1):

$$0.8 < |f_1|/f_W < 1.6 \quad (1)$$

where $f_1$ is the focal length of said first lens unit, and $f_W$ is the focal length of the total system at the wide angle position.

10. A two-unit zoom lens system as claimed in claim 7, which satisfies the following condition (2):

$$0.4 < e_T \cdot f_W/f_T < 3 \quad (2)$$

where $e_T$ is the air gap between said first and second lens units, $f_T$ is the focal length of the total system at the tele angle position, and $f_W$ is the focal length of the total system at the wide angle end.

11. A two-unit lens system as claim in claim 7, which satisfies the following condition (3):

$$0.3 < |f_N|/f_2 < 3 \quad (3)$$

where $f_2$ is the focal length of said second lens unit, and $f_N$ is the focal length of said second negative sub-lens unit in said second lens unit.

12. A two-unit lens system as claimed in claim 7, which satisfies the following condition (4):

$$0.4 < |r_a|/f_2 < 3 \quad (4)$$

where $f_2$ is the focal length of said second lens unit, and $r_a$ is the radius of curvature on the object side of said first negative sub-lens unit in said second lens unit.

* * * * *